(12) United States Patent
Andre' Parise

(10) Patent No.: US 9,068,633 B2
(45) Date of Patent: Jun. 30, 2015

(54) CONTINUOUS TRANSMISSION SYSTEM

(76) Inventor: Luis Andre' Parise, Florianopolis-S. Catarina (BR)

( * ) Notice: Subject to any disclaimer, the term of this patent is extended or adjusted under 35 U.S.C. 154(b) by 1122 days.

(21) Appl. No.: 13/121,464

(22) PCT Filed: Sep. 30, 2009

(86) PCT No.: PCT/BR2009/000328
§ 371 (c)(1),
(2), (4) Date: Jun. 14, 2011

(87) PCT Pub. No.: WO2010/037197
PCT Pub. Date: Apr. 8, 2010

(65) Prior Publication Data
US 2011/0237385 A1    Sep. 29, 2011

(30) Foreign Application Priority Data
Oct. 2, 2008 (BR) .............. PI 0805746-0

(51) Int. Cl.
*F16H 15/10* (2006.01)
*F16H 15/12* (2006.01)

(52) U.S. Cl.
CPC .................................. *F16H 15/12* (2013.01)

(58) Field of Classification Search
USPC .......................... 476/50, 67, 70, 73
See application file for complete search history.

(56) References Cited

U.S. PATENT DOCUMENTS

| 430,706 | A | * | 6/1890 | Stevens | 476/56 |
| 923,472 | A | * | 6/1909 | Williamson | 74/721 |
| 1,010,804 | A | * | 12/1911 | Robinson | 476/50 |
| 1,036,007 | A | * | 8/1912 | Robinson | 476/50 |
| 1,215,076 | A | * | 2/1917 | Tabor | 476/50 |
| 1,225,371 | A | * | 5/1917 | Sutton et al. | 476/50 |
| 1,232,349 | A | * | 7/1917 | McSorley | 476/50 |
| 1,633,316 | A | * | 6/1927 | Davis | 74/721 |
| 1,647,413 | A | * | 11/1927 | McPherson | 476/24 |
| 2,057,482 | A | * | 10/1936 | Erban | 475/191 |
| 2,435,122 | A | * | 1/1948 | Berndt | 476/56 |
| 2,481,315 | A | * | 9/1949 | Lehnert | 476/21 |
| 5,472,388 | A | * | 12/1995 | Lee et al. | 476/54 |

(Continued)

FOREIGN PATENT DOCUMENTS

| FR | 522616 | 8/1921 |
| FR | 1346385 | 12/1962 |

(Continued)

*Primary Examiner* — William Kelleher
*Assistant Examiner* — Zakaria Elahmadi
(74) *Attorney, Agent, or Firm* — Jacobson Holman, PLLC.

(57) ABSTRACT

Patent of invention for a transmission comprising a frame (1) provided with tracks (2) and a control carriage (3) having a control lever (3a) journaled in a bearing (3b) and spacers (3c and 3d) connecting the control carriage (3) to the switches (4 and 5) in their spin shaft (4a and 5a), colinear to the guide cutout shaft (4b and 5b) describing (FIGS. 25 to 28) a conicity which allows a limited angular movement between the switches (4 and 5) and the track (2), obtained by the control lever (3a) motion by means of control arms (3e) coupled to the switch bearings (4c and 5c), perpendicular to the spacers (3c and 3d) making up the primary (6) and secondary (7) input sliding assemblies, and having a variant (FIGS. 14 to 21) with two output sliding assemblies, primary (9) and secondary (10), each configured as the two input sliding assemblies, primary (6) and secondary (7), and another variant (FIGS. 22 to 24) with at least one articulated output sliding assembly (15).

19 Claims, 14 Drawing Sheets

(56) References Cited

U.S. PATENT DOCUMENTS

| | | | |
|---|---|---|---|
| 5,496,226 A * | 3/1996 | Splittstoesser et al. | 476/24 |
| 5,799,471 A * | 9/1998 | Chen | 53/556 |
| 6,494,806 B2 * | 12/2002 | Tsukada et al. | 476/8 |
| 6,840,886 B2 * | 1/2005 | Ohara | 476/67 |
| 6,884,198 B1 * | 4/2005 | Hoogenberg | 476/51 |
| 2003/0013574 A1 * | 1/2003 | Misada et al. | 476/40 |
| 2005/0097974 A1 * | 5/2005 | Espinosa | 74/111 |
| 2012/0149529 A1 * | 6/2012 | Sakagami et al. | 476/67 |

FOREIGN PATENT DOCUMENTS

| | | |
|---|---|---|
| FR | 2776736 | 10/1999 |
| GB | 182563 | 7/1922 |
| JP | 03-60644 | 6/1991 |
| RU | 1227867 | 4/1986 |

* cited by examiner

CONTINUOUS TRANSMISSION SYSTEM

This is a national stage of PCT/BR09/000328 filed Sep. 30, 2009 and published in English, which claims the priority of Brazil number PI 0805746-0 filed Oct. 2, 2008, hereby incorporated by reference.

The object of the present patent of invention is a new mechanical continuous transmission system which allows the conversion from a higher speed motor to a slower one by means of a drive shaft rotation speed.

Mechanisms to control drive shaft rotation speed are known in several different options and intended for several different functions. Usually known as "transmission" or "gearbox" due to its main function, that of shifting gears, by multiplying or dividing engine speed to the final drive, directly on the wheels or shaft with a power take-off so as to transform drive shaft power into power or speed, depending on the need. There are two main sequences of shafts in a typical gearbox: the primary shaft, which collects engine speed through the clutch, and the secondary shaft (output shaft) which transmits the rotation transformed into power or speed to the differential final shaft. Each shaft is provided with one or more gears with an equal or different diameter ratio so that, according to the meshing engagement, resulting speed is low, constant, or high in the output shaft. The greatest drawback of that model is the stepped shifting from one gear ratio to the other, which can cause discernible jerks while shifting.

Continuously variable transmissions have been propelling motorcycles and low-displacement motorbikes for quite a long time in a construction having elastomeric and toothed pulleys and chains. An automotive manufacturer, though, has developed a transmission called Multitronic based on the principles of continuously variable transmission, but which comprises the transmission between two pulleys whose conical shape allows an almost infinite ratio variation. This type of transmission uses gears but shifting configuration is carried out as needed. It is more silent and sturdy thus enabling its use in more powerful engines; ratios can vary from 6 to 1 between the shortest and longest speed, something that regular transmissions cannot achieve.

There is also the double-clutch transmission or dual-clutch transmission (DCT) which uses two clutches and employs sophisticated electronics and hydraulics to control them just as they do in a standard automatic transmission. In a DCT, however, the clutches operate independently. One clutch controls the odd gears (first, third, fifth and reverse), while the other controls the even gears (second, fourth and sixth). Using this arrangement, gears can be changed without interrupting the power flow from the engine to the transmission.

Notably, those are configurations denoting a great efficiency to continuously shift speed ratio although both have a very high cost.

Thus, in view of the problems evoked and with the purpose of solving them, the inventor has researched and developed the present model, titled CONTINUOUS TRANSMISSION SYSTEM, the main object of the present patent application comprising, in short, an input sliding gear with a shaft perpendicular to the shaft of a main disc, to which said input sliding gear is tangentially leaned to, being its diameter fixed and its relation with the main disc variable due to the diameter obtained by the point of the positioning thereof along the periphery of the main disc radius. The main disc contact point with the input sliding gear, whose rotation transmits less speed and more tractive force (torque), is the main disc higher diameter point. As the input sliding gear slides, bringing it closer to the main disc shaft, there is a progressive reduction of the diameter thereof at the contact point with the input sliding gear, thus changing speed and power ratio, reducing the tractive force and increasing the main disc speed. As noted, transition speed between speed and power is directly connected to the sliding speed of the input sliding gear in relation to the main disc, being that smooth and without any discernible jerks or changes. Speed variation is directly connected to the point in which the sliding gear contacts the main disc along its radius and correlated with its larger and smaller diameter. In the model presented, the main disc surface, as well as the sliding gear perimetral surface, are made up of anti-slipping material. Variants are also foreseen, always conforming to the same functional concept, wherein a first variant provides a secondary shaft and an output sliding gear which is pushed by the input sliding gear, thus providing multiplication in output speed of the main disc rotation.

Another great innovation in the object model of the present patent application the inventor has researched and developed, titled CONTINUOUS TRANSMISSION SYSTEM, is the possibility of having much larger ratios than conventional gear transmissions. Conventional gear transmissions have an average ratio of 1:3 or 1:4, split into 5 speeds, whereas the continuous transmission, with a much simpler mechanism, can present a ratio several times larger. The CONTINUOUS TRANSMISSION SYSTEM can have a "simple" or a "square" ratio, which means that a same initial mechanism with an X ratio, when added a few parts, will possess a square X ratio. The simplified design prototype possesses a ratio of approximately 1:5, which can be raised to a ratio of 1:25 in its "square" variant. Notably, as can also be proved hereinafter, the CONTINUOUS TRANSMISSION SYSTEM denotes several innovations concerning the proposed functionality and mechanism, thereby being worth of the requested patent application.

The model, which is the object of the present patent application, can be better understood from the following description, including numerical references to the below-mentioned Figures without, however, limiting proportions and materials that may have to be employed on its industrial production, in which.

Figure 1:
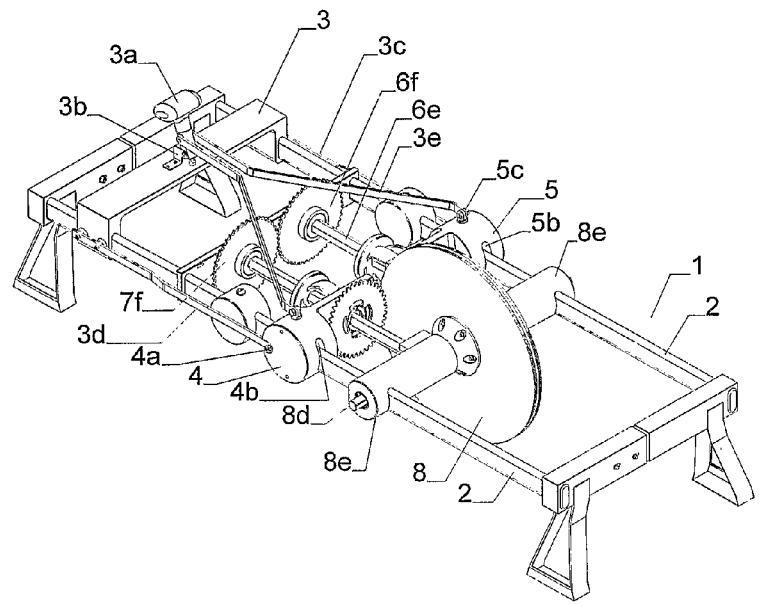
FIGS. 1 to 3 are, respectively, top frontal, top rear, and bottom frontal perspective views.
Figure 2:
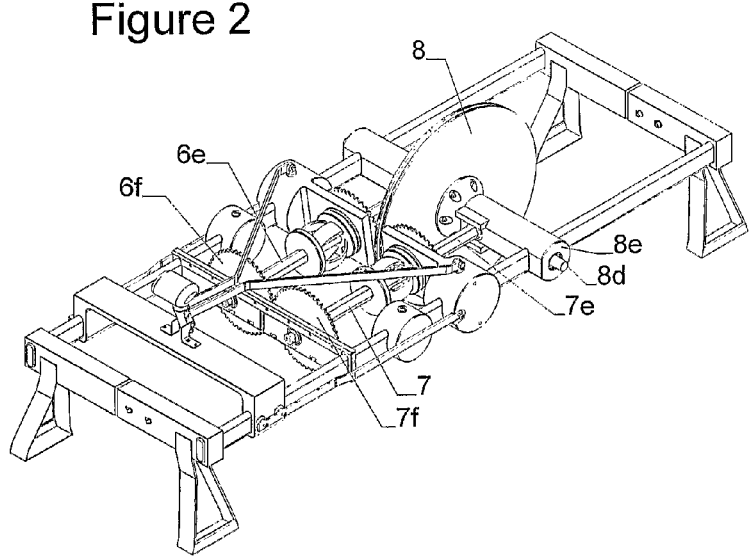
Figure 3:
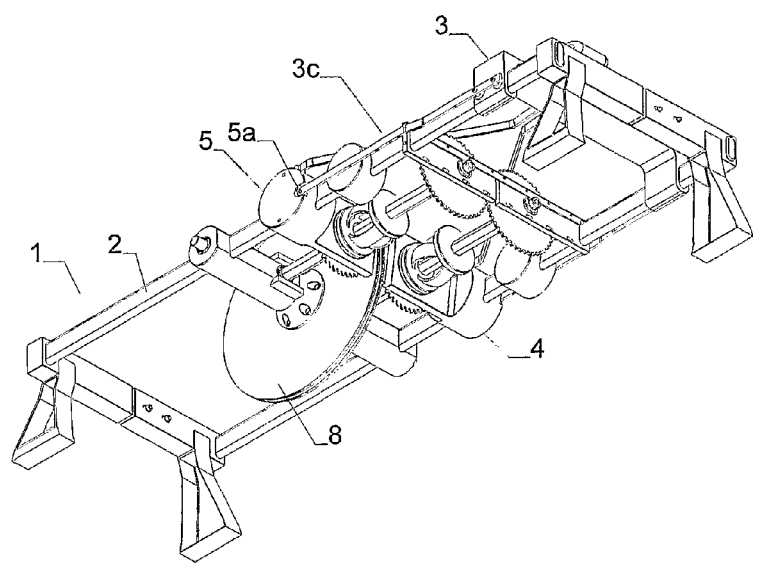
Figure 4:
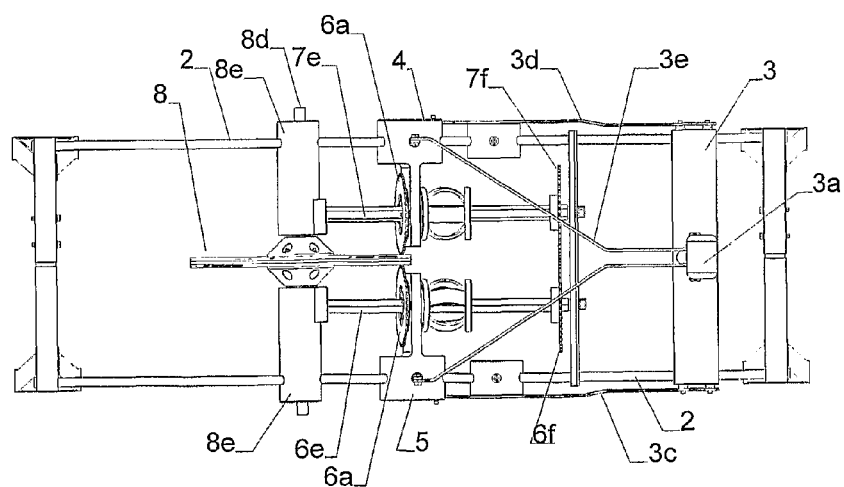
FIGS. 4 to 7 are, respectively, top, left side, frontal and rear views.
Figure 5:
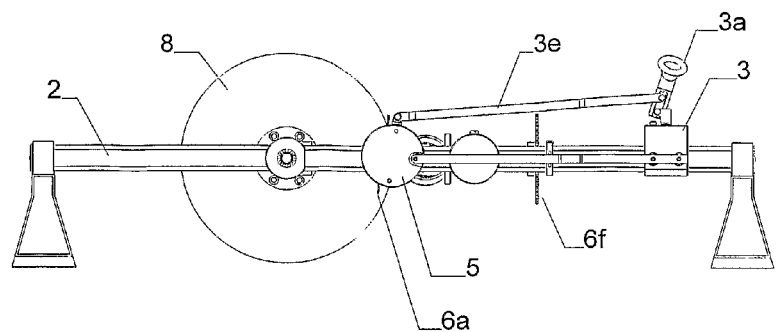
Figure 6:
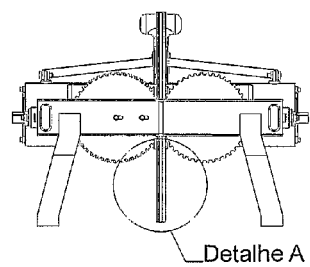
Figure 7:
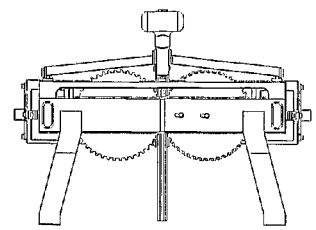
Figure 8:
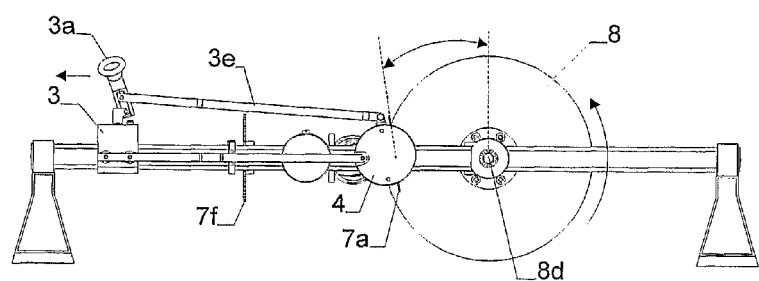
FIGS. 8 and 9 are right side views of the model, respectively, with the input sliding gear in two different angling degrees having an initial position in relation to the main disc.
Figure 16:
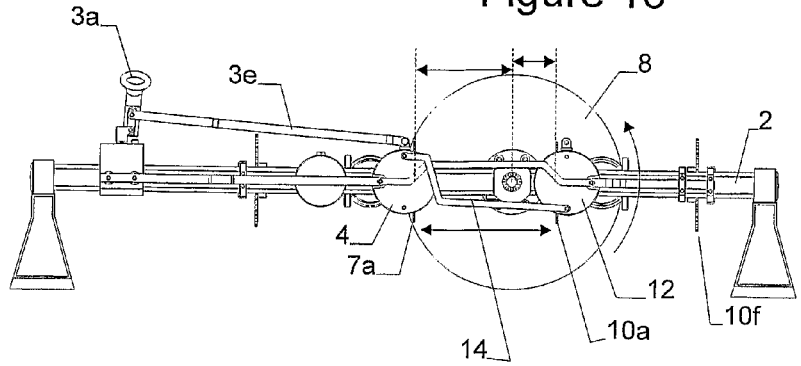
FIG. 16 is a right side view of the model in its variant having the output sliding gear illustrating the neutral angling moment of the input and output sliding gears and the initial position of both in relation to the main disc. Arrows indicate parallelism of input and output sliding gears, making evident the stability of the situation.
Figure 17:
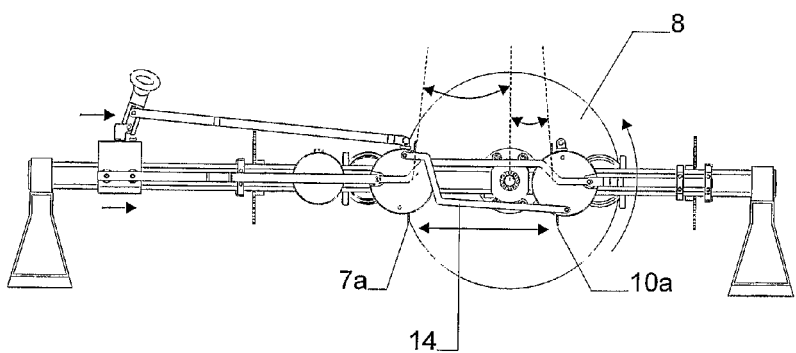
Figure 18:
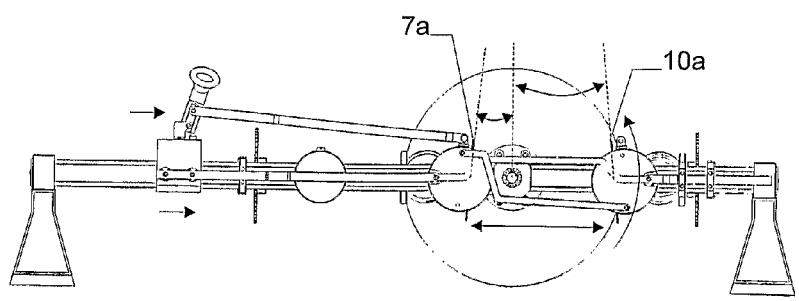
Figure 19:
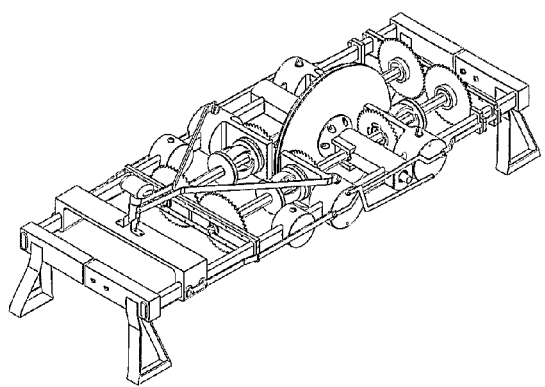
Figure 20:
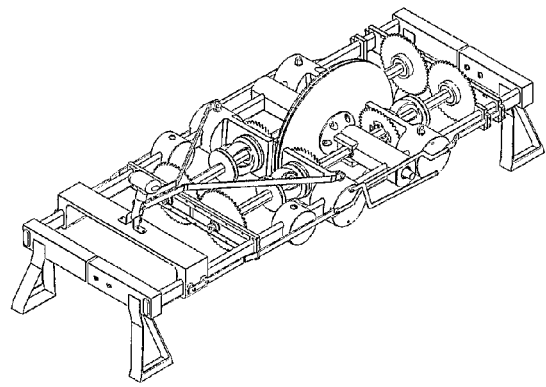
Figure 21:
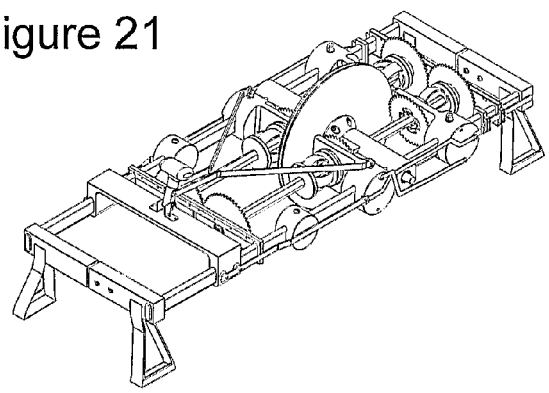
Figure 22:
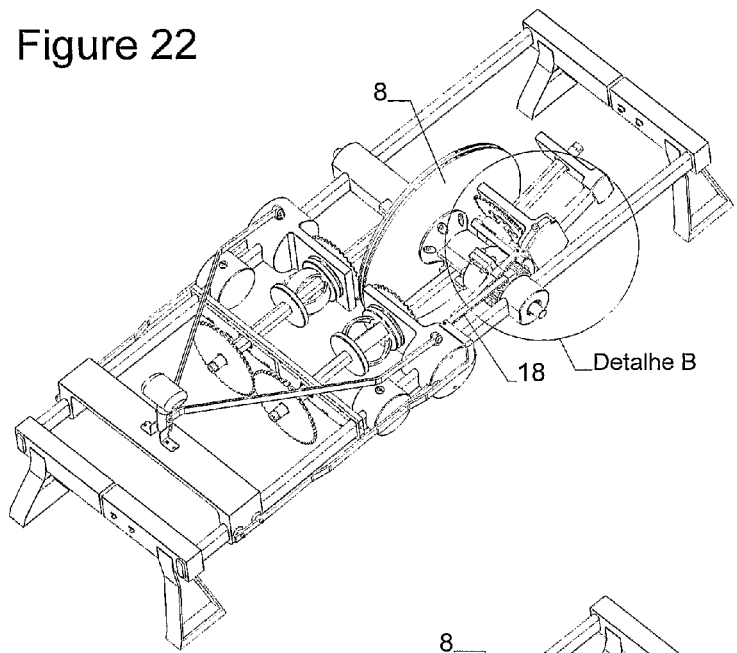
Figure 23:
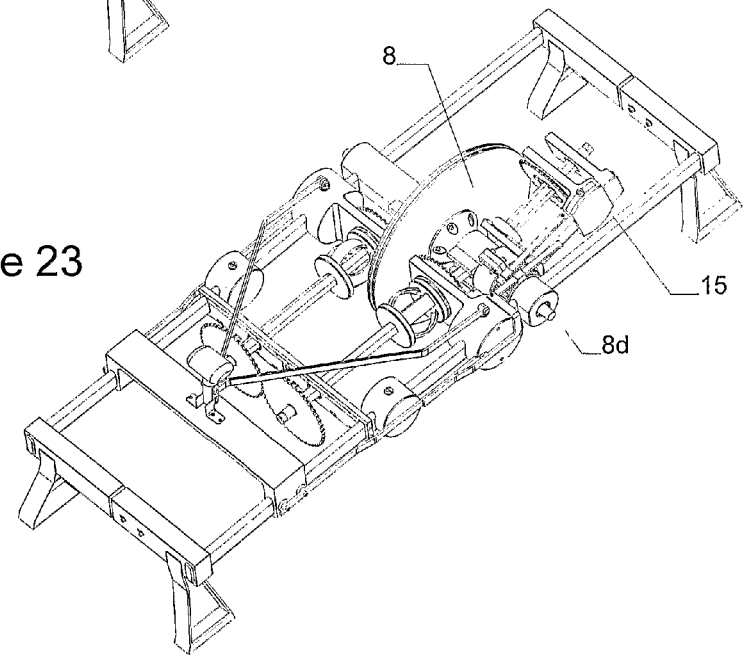
Figure 24:
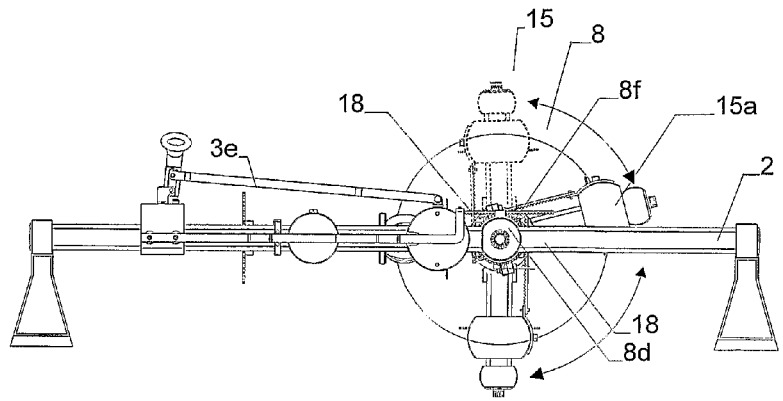
Figure 25:
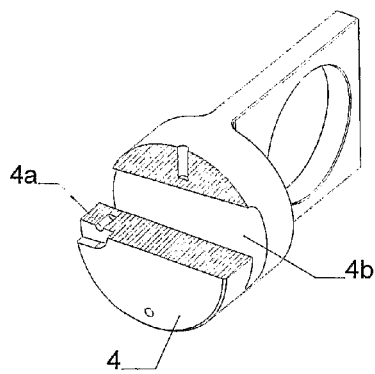
Figure 26:
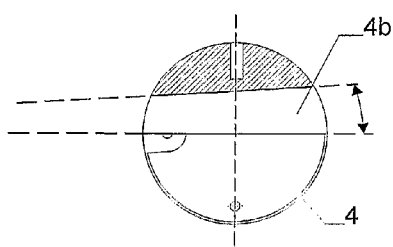
Figure 27:
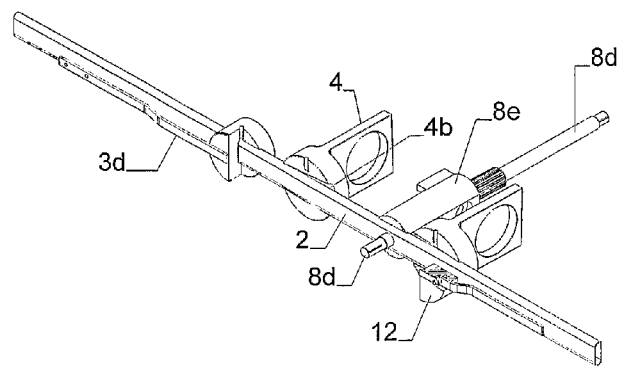
Figure 28:
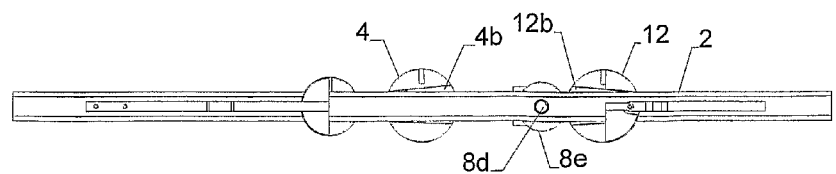
Figure 29:
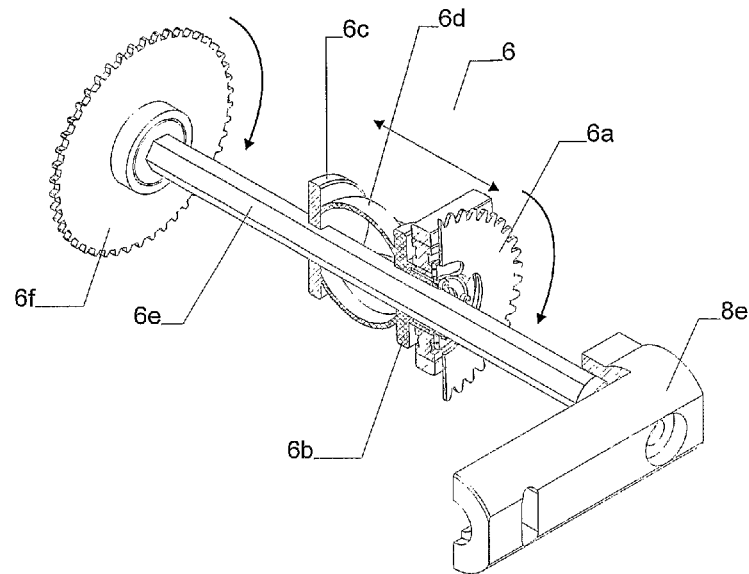
Figure 30:
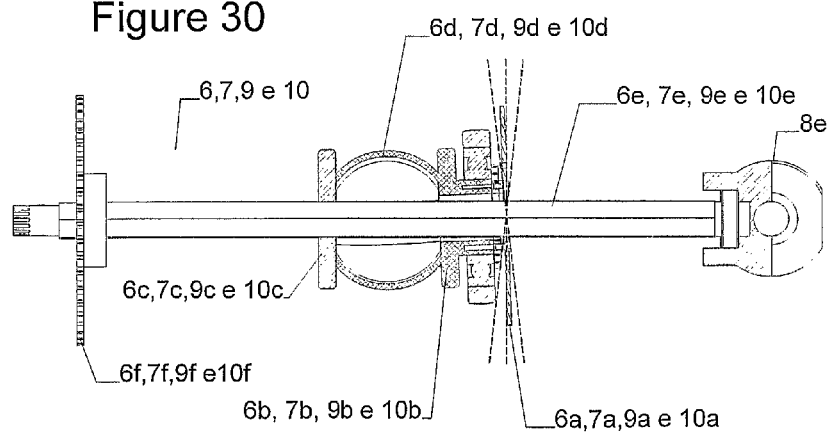
Figure 31:
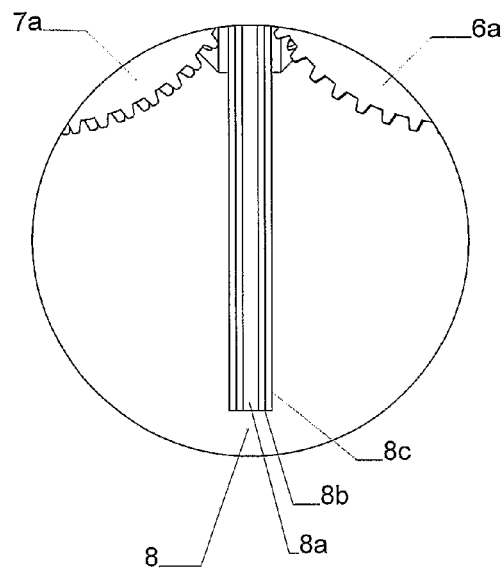
Figure 32:
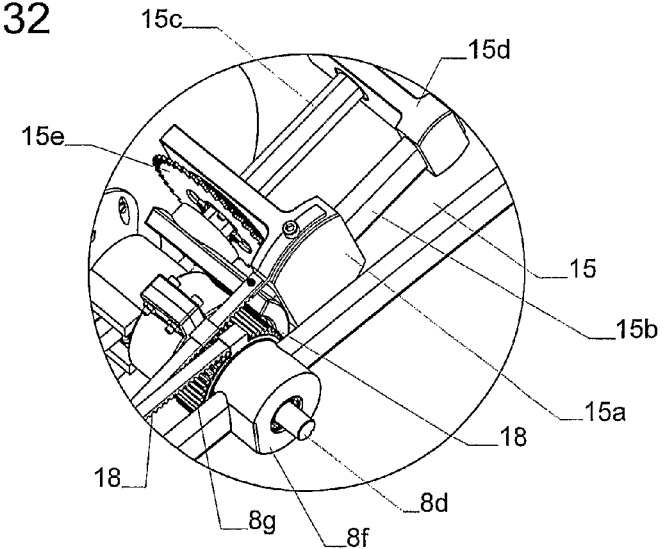

FIG. 17 is a right side view of the model in its variant having the output sliding gear illustrating the advancement of the angling moment of the input sliding gear and the reverse angling of the output sliding gear at the initial position of both in relation to the main disc. Arrows indicate the direction of the movable components. Sliding advance movement of input and output sliding gears is parallel;

FIG. 18 is a right side view of the model in its variant having the output sliding gear illustrating the advancement of the angling moment of the input sliding gear and the reverse angling of the output sliding gear and the final position of both in relation to the main disc. Arrows indicate the direction of movable components;

FIGS. 19 to 21 are top rear perspective views of the model in its variant having the output sliding gear illustrating the situations described in FIGS. 16 to 18. Sliding advance movement of input and output sliding gears is parallel;

FIG. 22 is a top rear perspective view of the model in another variant having the output sliding gear coupled to a rotating bearing shaft with respect to the main disc shaft, illustrating the initial position of the input and output sliding gears in relation to the main disc;

FIG. 23 is a top rear perspective view of the model in its variant having the output sliding gear coupled a rotating bearing shaft with respect to the main disc shaft, illustrating the final position of the input and output sliding gears in relation to the main disc;

FIG. 24 is a right side view of the model in its variant having the output sliding gear coupled to a rotating bearing shaft with respect to the main disc shaft, illustrating the final position of the input and output sliding gears in relation to the main disc and the possibility of rotation of the output shaft in relation to the main disc shaft;

FIGS. 25 and 26 are cross-sectional details of the switch, in both perspective and side views, showing the guide cutout conicity. These Figures represent the component found in the two input sliding assemblies, primary (6) and secondary (7), and in the two output sliding assemblies, primary (9) and secondary (10);

FIGS. 27 and 28 are cross-sectional details of the track and switches, in both perspective and side views, showing the guide cutout conicity and its position on the track;

FIGS. 29 and 30 are cross-sectional details of the sliding gear flexible articulated assembly showing its position with variable angling in relation to the shaft (FIG. 30) controlled by the switch (4). These Figures represent the components found in the two input sliding assemblies, primary (6) and secondary (7), and in the two output sliding assemblies, primary (9) and secondary (10);

FIG. 31 is an enlargement of detail A of FIG. 6;

FIG. 32 is an enlargement of detail B of FIG. 22.

Figure 9:
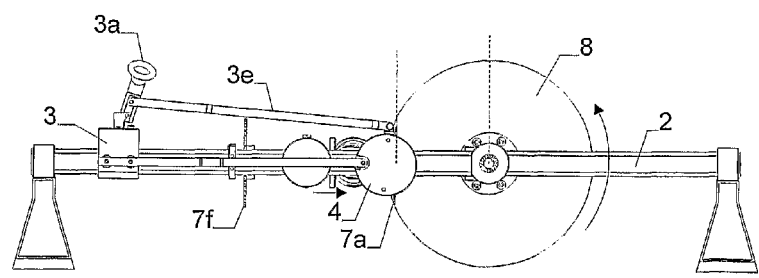
Figure 10:
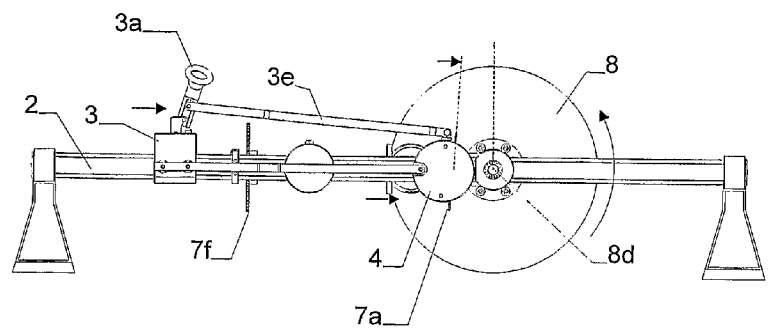
FIGS. 10 and 11 are right side views of the model, respectively, with the input sliding gear in two different angling degrees having a final position in relation to the main disc.
Figure 11:
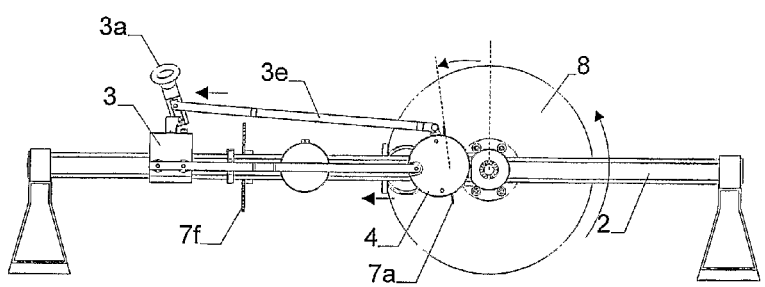
Figure 12:
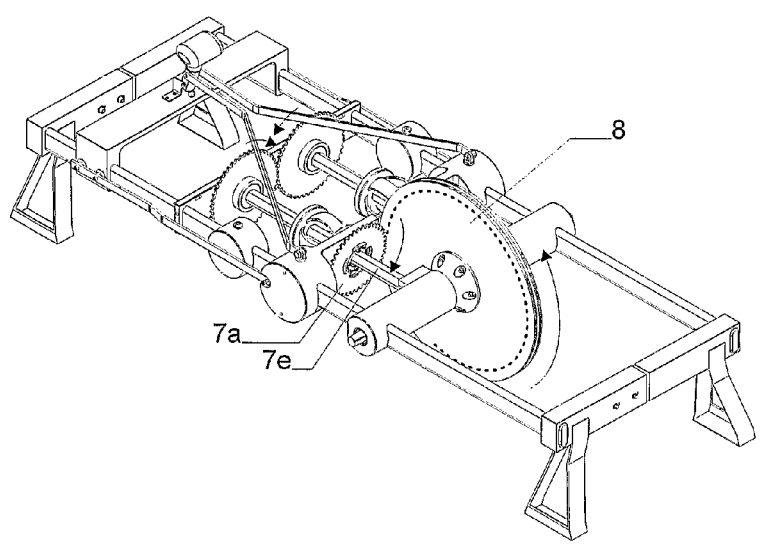
FIG. 12 is a perspective view of the input sliding gear at its initial position in relation to the main disc.
Figure 13:
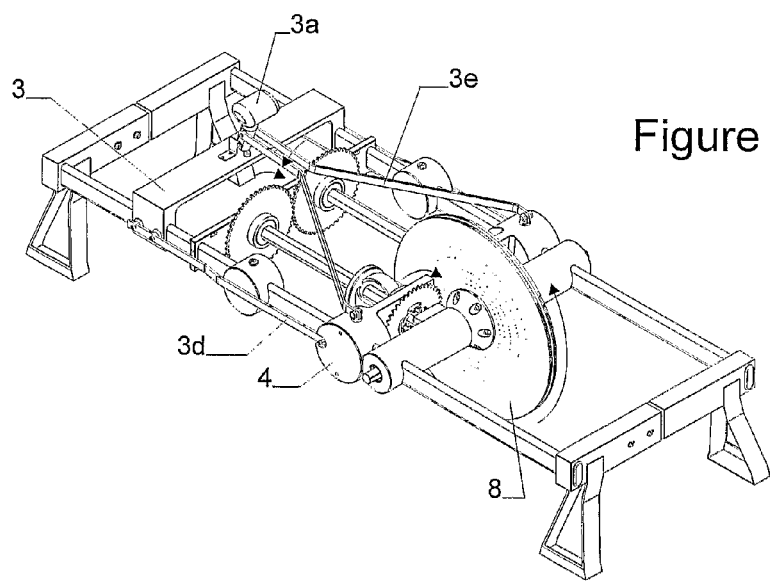
FIG. 13 is a perspective view of the input sliding gear at its final position in relation to the main disc, representing on the main disc surface its diameter ratio variations.
Figure 14:
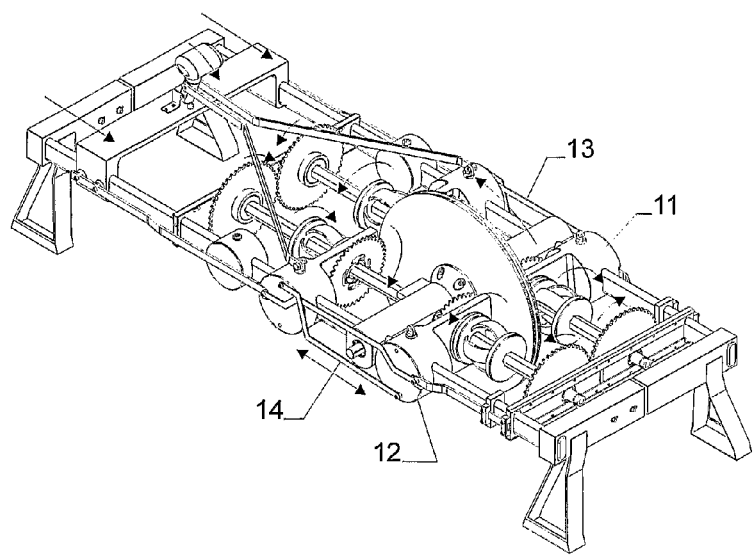
FIG. 14 is a frontal perspective view of a variant of the model having the output sliding gear and showing the revolution directions thereof, the main disc and the input sliding gear. Sliding advance movement of input and output sliding gears is parallel.
Figure 15:
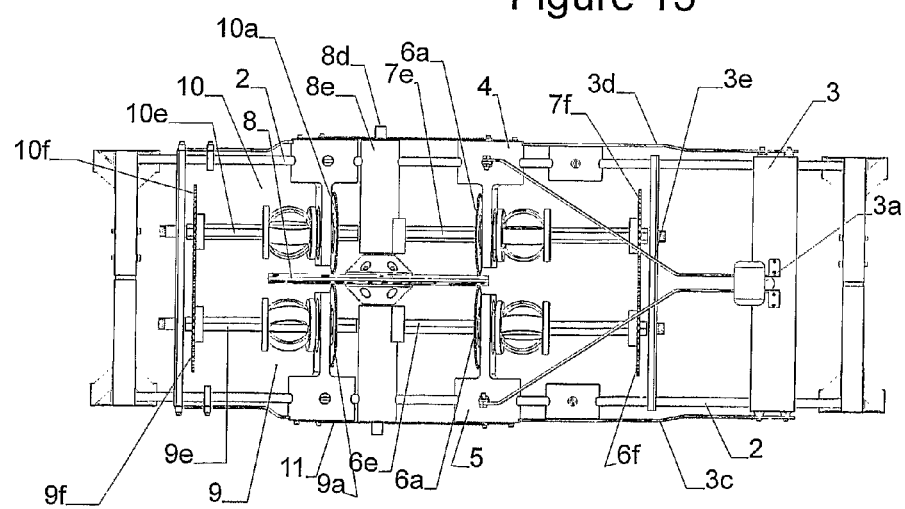
FIG. 15 is a top view of the variant of the model having the output sliding gear, the main disc and the input sliding gear. Sliding advance movement of input and output sliding gears is parallel.

According to the above-mentioned Figures and as many as necessary to illustrate the present patent application, the CONTINUOUS TRANSMISSION SYSTEM comprises a frame (1) provided with tracks (2) and a control carriage (3) having a control lever (3a) supported on a bearing (3b) and spacers (3c and 3d) connecting the control carriage (3) to the switches (4 and 5) on their spin shaft (4a and 5a), colinear to the guide cutout shaft (4b and 5b) describing (FIGS. 25 to 28) a conicity which allows a limited angular movement between the switches (4 and 5) and the track (2) obtained by the control lever (3a) motion, by means of control arms (3e) coupled to switch bearings (4c and 5c), and perpendicular to the spacers (3c and 3d);

Two distinct moments are described in the principle of operation of the CONTINUOUS TRANSMISSION SYSTEM, being MP—Maximum Power moment and MS—Maximum Speed moment. The control lever (3a) presents three different stages: I-Neutral=control lever (3a) is in the central position (FIG. 9) and maintains gear ratio stable where it currently is; II-Speed=Pushing control lever (3a) forward (FIG. 10), transmission starts upshifting, in a continuous and progressive way, while control lever (3a) is in said position; III-Power=Pulling control lever (3a) backwards (FIG. 11) starts downshifting and consequent power increase; two input sliding assemblies, primary (6) and secondary (7), are provided with a primary (6a) and a secondary (7a) input sliding gear, each coupled to a primary (6b) and secondary (7b) driven ring, and to the switches (4 and 5), said driven ring (6b and 7b) being away from the drive shaft (primary-6e or secondary-7e), but the same driven ring (6b and 7b) is connected to the drive ring (6c and 7c) by means of a flexible link (6d and 7d) which allows the sliding gears (6a and 7a) to tilt at an angle by means of the flexible link (6d and 7d) twisting, thus maintaining traction in relation to the main disc (8), provided by the drive ring (6c and 7c) and its connection to the drive shaft (primary-6e or secondary-7e) which is driven by an electric motor, by combustion, by pedals or others, coupled to one of the drive shafts (primary-6e or secondary-7e) or to both of them. The drive shafts (primary-6e or secondary-7e) can have a hexagonal or splined configuration or even other profiles allowing the longitudinal sliding of the assemblies (FIG. 29). Thus, for instance, if the input sliding gears (6a and 7a) have an "X" diameter and the main disc (8) a maximum contact diameter of "5X" and a minimum contact diameter of "1X", equal to the "X" diameter of the input sliding gears (6a and 7a), the result is a variable ratio of 1:5 to 1:1. The main disc (8) can be configured by 5 connected discs (FIG. 31), being one of them central (8a) and made of steel, two made of nylon (8b) to increase thickness, and two outer ones made of anti-slipping material (8c), fixed to one other and coupled to the main shaft (8d) journaled in main bearings (8e) which also serves as a support for the drive shafts (primary-6e or secondary-7e). Said main shaft (8d) allows power transfer and power output from the main disc (8) and can be connected to any device an individual wishes to drive or to a power take-off through the main shaft (8d) driven by an electric motor, by combustion, by pedals or others, and having coupled to the main disc (8) one or more output sliding assemblies that can operate independently or in a synchronized way.

It should be pointed out the several possibilities of composition and formation of the main disc and other transmission components with the use of several different ultra light and/or super-resistant materials, "composites", and etc, according to the foreseen use.

Control lever position (3a) forward forces the switch bearings (4c and 5c), by means of control arms (3e) and the switches (4 and 5), to rotate (FIG. 10) on their spin shaft (4a and 5a), thus allowing the input sliding gears (6a and 7a) to tilt forward and, thus, advance, while rotating, towards the center of the main disc (8).

A primary drive gear (6f) drives the primary drive shaft (6) and, in reverse rotation, a secondary drive gear (7f) drives the secondary drive shaft (7). That assembly provides a combined drive of the main disc (8) two faces.

A variant (FIGS. 14 to 21) provided with two output sliding assemblies, primary (9) and secondary (10), each configured as the two input sliding assemblies, primary (6) and secondary (7), with primary (9a) and secondary (10a) output sliding gears, each coupled to a primary (9b) and secondary (10b) driven ring, and to the switches (11 and 12), said driven ring (9b and 10b) being away from the drive shaft (primary-9 and secondary-10e), but the driven ring (9b and 10b) being connected to the drive ring (9c and 10c) by means of a flexible link (9d and 10d) which allows the output sliding gear (9a and 10a) to tilt at an angle by means of the flexible link (9d and 10d) twisting, thus maintaining traction in relation to the main disc (8). In this variant (FIGS. 14 to 21), sliding advance movement of the two input sliding assemblies, primary (6) and secondary (7), and of the two output sliding assemblies, primary (9) and secondary (10), is parallel and synchronized by the auxiliary spacers (13 and 14) fixed in top points in the switches (4 and 5) and bottom points in the switches (11 and 12). The main disc (8), driven by the input sliding assemblies, primary (6) and secondary (7), drives the two output sliding assemblies, primary (9) and secondary (10), in reverse rotation and, simultaneously, the primary (9f) and secondary (10f) auxiliary drive gears. One end of the drive shafts (primary-9 and secondary-10e) is fixed to the main bearings (8e) and at its opposite end pulleys, several gears or a propeller shaft and a differential can be coupled, thus obtaining a gear ratio at the output assembly whose result will be the input assembly square ratio. The drive shafts (primary-9e and secondary-10e) can be used in conjunction with the main shaft (8d), thus allowing independent drives with different speeds for different attachments.

Another variant (FIGS. 22 to 24) is provided with at least one articulated output sliding assembly (15) configured by a sliding switch (15a) on an auxiliary track (15b), an articulated drive shaft (15c) and a shaft guide (15d) mounted on the end of the auxiliary track (15b). An auxiliary gear (15e) is coupled to the switch (15a) and is also coupled to the articulated drive shaft (15c), which in turn, is supported and fastened to the auxiliary main bearing (8f) provided with a gear (8g) which is linked with two ring gears (18) which, arranged on the same side of the gear (8g), provide a combined motion of the output sliding assemblies, primary (9) and secondary (10), and the articulated output sliding assembly (15), thus obtaining a gear ratio whose result will be the input assembly square ratio. The auxiliary track articulated setting (15b) on the auxiliary main bearing (8f) allows the output assembly (FIG. 24) to rotate around the main shaft (8d), thus enabling an adaptation of the drive shaft (primary-9e and secondary-10e) angular positioning. The main disc (8), driven by the input sliding assemblies, primary (6) and secondary (7), drives the auxiliary gear (15e) and its articulated drive shaft (15c) wherein it can be coupled to any attachment, directly or by means of an additional pulley or gear, and which can be used in conjunction with the main shaft (8d), thereby allowing independent drives with different speeds for different attachments or the same speeds for differently positioned attachments.

Notably, the model introduced and explained in details above in its manual version, can also be automated, including electronic management of manner of use and components power (engine, transmission and attachments or traction), by connecting pneumatic, hydraulic or electrical mechanisms for sliding the control carriage (3), the two input and output sliding assemblies, primary (9) and secondary (10), switch linkage (4 and 5 and 11 and 12), as well as the articulated output sliding assembly linkage (15), in its described variant (FIGS. 22 to 24). Suppression of one of the two input sliding assemblies, primary (6) and secondary (7), may also be provided.

The invention claimed is:

1. A continuous transmission system comprising
   a frame provided with tracks and a control carriage which slides along said tracks and has a control lever journaled in a bearing,
   spacers connecting the control carriage to switches in their spin shaft, colinear to guide cutout shaft describing a conicity that allows a limited angular movement between switches and the tracks around an axis perpendicular to the tracks,
   said angular movement being obtained through the control lever motion, by means of control arms coupled to switch bearings,
   characterized in that it further comprises a primary and a secondary input sliding assemblies, each being provided with
   an input sliding gear coupled to a driven ring, and to one of the switches,
   being said driven ring backlash coupled with the drive shaft,
   said driven ring being connected to respective drive ring by means of a flexible link,
   said flexible link twisting and allowing the sliding gear to tilt at an angle thus maintaining traction in relation to a main disc,
   said drive ring being connected to the drive shaft, which allow the longitudinal sliding of the assemblies driven by an electric motor, by combustion, by pedals or others, coupled to one of the drive shafts or to both of them.

2. The continuous transmission system according to claim 1, characterized in that the control lever position forward forces the switch bearings to rotate on their spin shaft thus allowing the input sliding gears to tilt forward and advance, while rotating, towards the center of the main disc.

3. The continuous transmission system according to claim 1, characterized in that a primary drive gear drives the primary drive shaft and, in reverse rotation, the secondary drive gear drives the secondary drive shaft.

4. The continuous transmission system according to claim 1, characterized in that it comprises two output sliding assemblies, primary and secondary, each configured as the two input sliding assemblies, primary and secondary, with primary and secondary output sliding gears, each coupled to a driven ring, primary and secondary, and to the switches, wherein the driven ring is away from the drive shaft, but the same driven ring is connected with the drive ring by means of a flexible link that allows the output sliding gear to tilt at an angle by means of the flexible link twisting, thus maintaining traction in relation to the main disc.

5. The continuous transmission system according to claim 4, characterized in that it is provided with at least one articulated output sliding assembly, configured by a sliding switch on an auxiliary track, an articulated drive shaft and a shaft guide mounted on the end of the auxiliary track and an auxiliary gear coupled to the switch and also coupled to the articulated drive shaft, which in turn, is supported and fastened to the auxiliary main bearing provided with a gear which is linked with two ring gears which, arranged on the same side of the gear, provide a combined motion of the output sliding assemblies, primary and secondary, and the articulated output sliding assembly and the auxiliary track articulated setting on the auxiliary main bearing allows the output assembly to rotate around the main disc.

6. The continuous transmission system according to claim 4, characterized in that the sliding advance movement of the two input sliding assemblies, primary and secondary, and of the two output sliding assemblies, primary and secondary, is parallel and synchronized by the auxiliary spacers fixed in top points in the switches and bottom points in the switches.

7. The continuous transmission system according to claim 6, characterized in that the main disc drives the two output sliding assemblies, primary and secondary in reverse rotation and, simultaneously, the primary and secondary auxiliary drive gears.

8. The continuous transmission system according to claim 6, characterized in that the drive shafts can be used in conjunction with the main disc, thus allowing independent drives with different speeds for different attachments.

9. The continuous transmission system according to claim 5, characterized in that the combined motion of the output sliding assemblies, primary and secondary, and the articulated output sliding assembly provide a gear ratio whose result will be the input assembly square ratio. Auxiliary track articulated setting enables adaptation of the drive shaft angular positioning.

10. The continuous transmission system according to claim 5, characterized in that the main disc, driven by the input sliding assemblies, primary and secondary, drives the auxiliary gear and its articulated drive shaft wherein it can be coupled to any attachment, and which can be used in conjunction with the main shaft, thereby allowing independent drives with different speeds for different attachments or the same speeds for differently positioned attachments.

11. The continuous transmission system according to claim 1, characterized in that it comprises a primary and a secondary output sliding assemblies, each provided with
   an output sliding gear coupled to a driven ring and to switches,
   wherein said driven ring is away from a drive shaft,
   said driven ring being connected to a drive ring by means of a flexible link,
   said flexible link twisting and allowing the output sliding gear to tilt at an angle, thus maintaining traction in relation to the main disc.

12. The continuous transmission system according to claim 11, characterized in that it is provided with at least one articulated output sliding assembly provided with
   a switch sliding on an auxiliary track,
   an articulated drive shaft and a shaft guide mounted at the end of the auxiliary track,
   an auxiliary gear coupled to the switch and also coupled to the articulated drive shaft, which in turn, is supported and fastened to an auxiliary main bearing provided with a gear which is linked with a ring gear which is arranged on the same side of the gear,
   thus providing a combined motion of said primary and secondary output sliding assemblies,
   the articulated output sliding assembly and the auxiliary track articulated setting on the auxiliary main bearing allowing the output assemblies to rotate around the main disc.

13. The continuous transmission system according to claim 11, characterized in that the sliding advance movement of the two input sliding assemblies and of the two output sliding assemblies is parallel and synchronized by auxiliary spacers fixed in top points of the switches of the two input sliding assemblies and in bottom points of the switches of the two output sliding assemblies.

14. The continuous transmission system according to according to claim 13, characterized in that the main disc drives the two output sliding assemblies in reverse rotation and, simultaneously, respective auxiliary drive gears.

15. The continuous transmission system according to according to claim 14, characterized in that the drive shafts of the output sliding assemblies can be used in conjunction with the main disc, thus allowing independent drives with different speeds for different attachments.

16. The continuous transmission system according to according to claim 12, characterized in that the combined motion of the output sliding assemblies and of the articulated output sliding assembly provide a gear ratio whose result will be the input assembly square ratio, auxiliary track articulated setting enabling adaptation to the angular positioning of the drive shaft.

17. The continuous transmission system according to according to claim 12, characterized in that the main disc, driven by the input sliding assemblies, drives the auxiliary gear and its articulated drive shaft wherein it can be coupled to any attachment, and which can be used in conjunction with the main shaft (8*d*), thereby allowing independent drives with different speeds for different attachments or the same speeds for differently positioned attachments.

18. The continuous transmission system according to according to claim 1, characterized in that
   each of said switches comprises a drum provided with a passing cutout housing the track such that said drum can rotate around an axis perpendicular to the drive shaft according to a limited angular movement with respect to said track,
   each switches comprising also a guide shaft, fixed to said drum, towards and perpendicular to the drive shaft which is guided by said guide shaft through an annular opening,
   said guide shaft being connected to the driven ring thus transmitting the rotation of the sliding gear around an axis perpendicular to the drive shaft, to the flexible link.

19. The continuous transmission system according to according to claim 18, characterized in that
   said flexible link comprises a plurality of flexible calotte portions around the drive shaft, each flexible calotte portion flexibly connecting the driven ring to the drive ring such that the driven ring can rotate around an axis perpendicular to the drive shaft while the drive ring remain fixed to the drive shaft rotating with it around the axis of the same drive shaft.

\* \* \* \* \*